(12) United States Patent
Ferreira et al.

(10) Patent No.: US 9,680,781 B2
(45) Date of Patent: Jun. 13, 2017

(54) SYSTEM AND METHOD FOR IDENTIFYING AN EXPERT

(71) Applicant: Bank of America Corporation, Charlotte, NC (US)

(72) Inventors: Wilson Ferreira, New York, NY (US); Samuel Howgego, Colchester (GB); Stephen M. Harris, Canon City, CO (US)

(73) Assignee: Bank of America Corporation, Charlotte, NC (US)

( * ) Notice: Subject to any disclaimer, the term of this patent is extended or adjusted under 35 U.S.C. 154(b) by 147 days.

(21) Appl. No.: 14/472,751

(22) Filed: Aug. 29, 2014

(65) Prior Publication Data

US 2016/0065508 A1    Mar. 3, 2016

(51) Int. Cl.
*G06F 15/16* (2006.01)
*H04L 12/58* (2006.01)
*H04L 29/08* (2006.01)

(52) U.S. Cl.
CPC .............. *H04L 51/14* (2013.01); *H04L 67/22* (2013.01); *H04L 67/306* (2013.01)

(58) Field of Classification Search
CPC ........ H04L 51/043; H04L 67/22; H04L 51/14
USPC ................. 709/205, 206, 217, 219
See application file for complete search history.

(56) References Cited

U.S. PATENT DOCUMENTS

| | | | | |
|---|---|---|---|---|
| 7,853,602 B2* | 12/2010 | Gorti | ................. | G06F 17/30997 707/727 |
| 2006/0036685 A1* | 2/2006 | Canning | ................. | H04L 67/32 709/204 |
| 2012/0231435 A1* | 9/2012 | McBride | ................. | G09B 7/02 434/350 |
| 2013/0246327 A1* | 9/2013 | Tabrizi | ................... | G06Q 30/01 706/50 |
| 2014/0040385 A1* | 2/2014 | Hofman | ................. | G06Q 10/10 709/206 |
| 2016/0253426 A1* | 9/2016 | Snapir | ................ | G06Q 30/0201 |

* cited by examiner

*Primary Examiner* — Liangche A Wang
*Assistant Examiner* — Kaylee Huang
(74) *Attorney, Agent, or Firm* — Michael A. Springs

(57) ABSTRACT

According to one embodiment, a system includes an interface, a memory, and a processor. The interface receives, from a first device associated with a requesting user, a request. The requesting user is associated with an enterprise group. The enterprise group comprises a plurality of users. The memory is operable to store e-mail information for each of the plurality of users in the enterprise group. A processor is communicatively coupled to the interface and the memory and is operable to determine, based on the request and the e-mail information, one or more expert users in the enterprise group to provide a response to the request.

5 Claims, 3 Drawing Sheets

SYSTEM AND METHOD FOR IDENTIFYING AN EXPERT

TECHNICAL FIELD

This invention relates generally to determining an expert user in an enterprise group and, more specifically, determining an expert user in an enterprise group to respond to a question.

BACKGROUND

Users in an enterprise group may spend a significant amount of their time gathering information. One source of information may be expert users within the enterprise group. Determining the expert user(s) to contact regarding a particular question may consume a significant amount of time. Users may need to communicate with several other users within the enterprise group and/or conduct time consuming research to identify an expert user with sufficient knowledge to assist the requesting user.

SUMMARY OF EXAMPLE EMBODIMENTS

According to embodiments of the present disclosure, disadvantages and problems associated with previous systems for determining an expert user in an enterprise group to respond to a question may be reduced or eliminated.

According to one embodiment, a system includes an interface, a memory, and a processor. The interface receives, from a first device associated with a requesting user, a request. The requesting user is associated with an enterprise group. The enterprise group comprises a plurality of users. The memory is operable to store e-mail information for each of the plurality of users in the enterprise group. A processor is communicatively coupled to the interface and the memory and is operable to determine, based on the request and the e-mail information, one or more expert users in the enterprise group to provide a response to the request.

Certain embodiments of the disclosure may provide one or more technical advantages. For example, determining one or more expert users in the enterprise group to provide a response to the request based on the request and e-mail information may provide an efficient way to help gather information from an expert user. Accordingly, a user may identify an expert user and gather information more quickly and easily while using fewer network resources than might be needed otherwise. Another advantage of an embodiment may be more accurate identification of expert users. For example, using e-mail information and/or other user activity of users in the enterprise group may more accurately identify an expert user than asking other users and/or conducting other research may be able to. Another advantage of an embodiment is identifying expert users within the same enterprise group as the requesting user. For example, certain embodiments may only identify users within the same enterprise group of the requesting user, which may be advantageous for complying with institutional rules and/or laws.

Certain embodiments of the present disclosure may include some, all, or none of the above advantages. One or more other technical or other advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description taken in conjunction with the accompanying drawings, in which.

DETAILED DESCRIPTION

Figure 1:
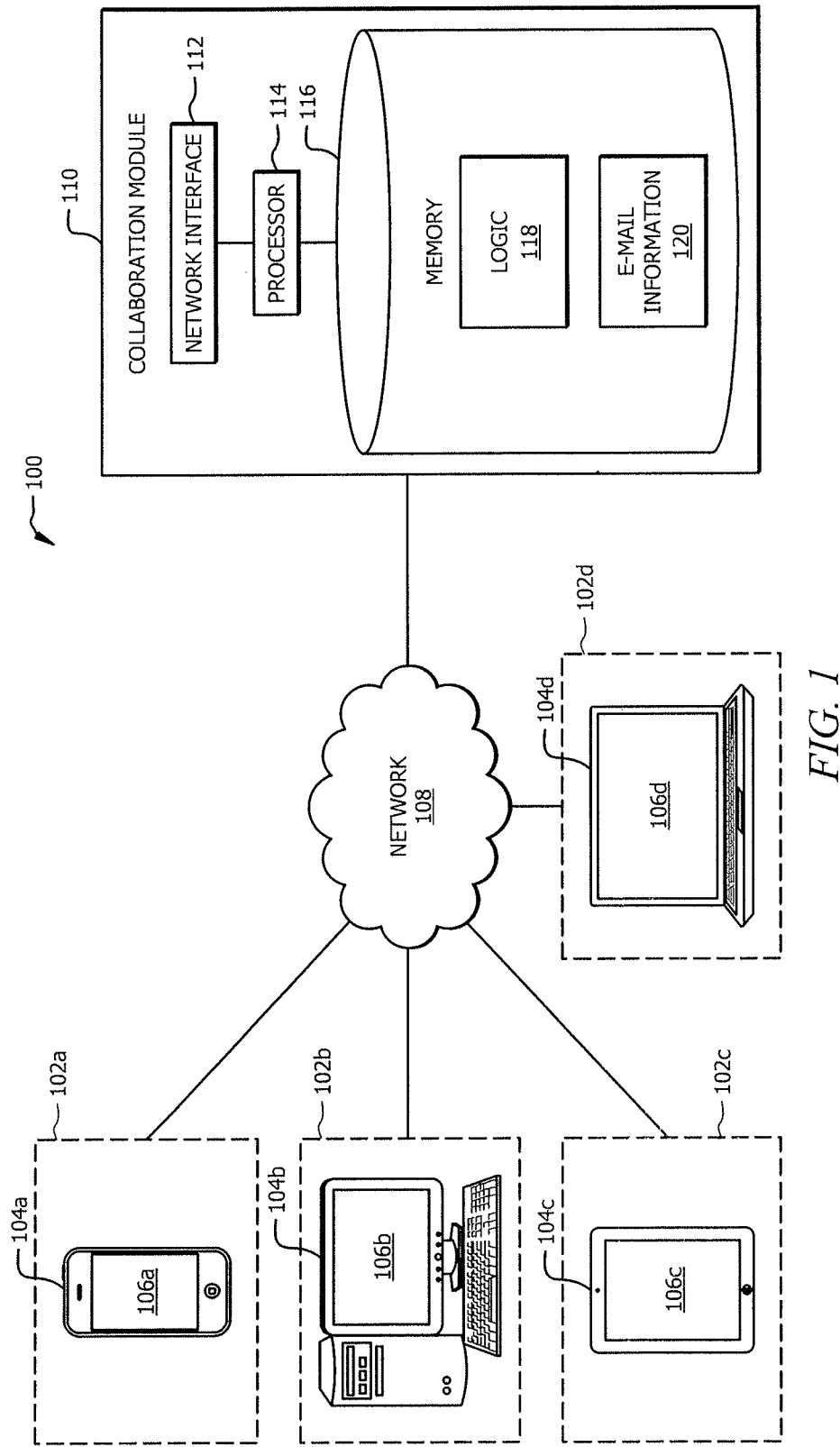
FIG. 1 illustrates a system for facilitating determining an expert user in an enterprise group to respond to a question, according to one embodiment of the present disclosure.
Figure 2:
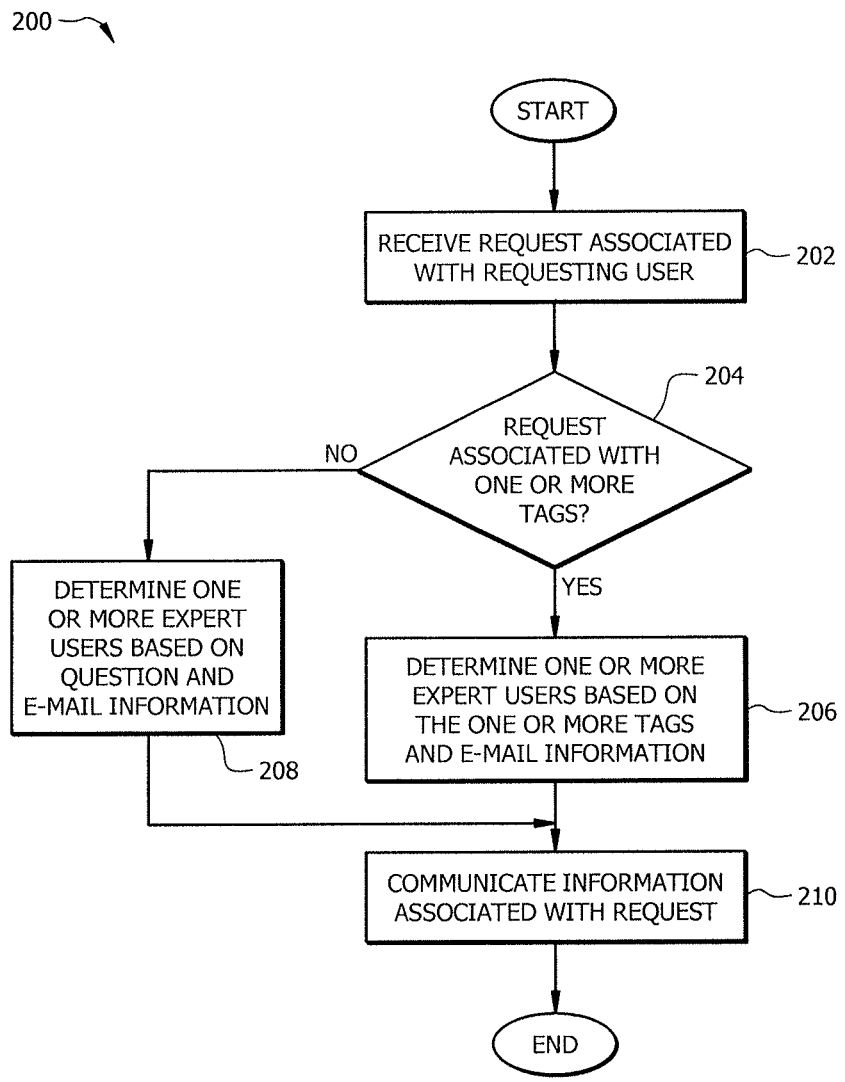
FIG. 2 illustrates an example method for facilitating determining an expert user in an enterprise group to respond to a question, according to one embodiment of the present disclosure.
Figure 3:
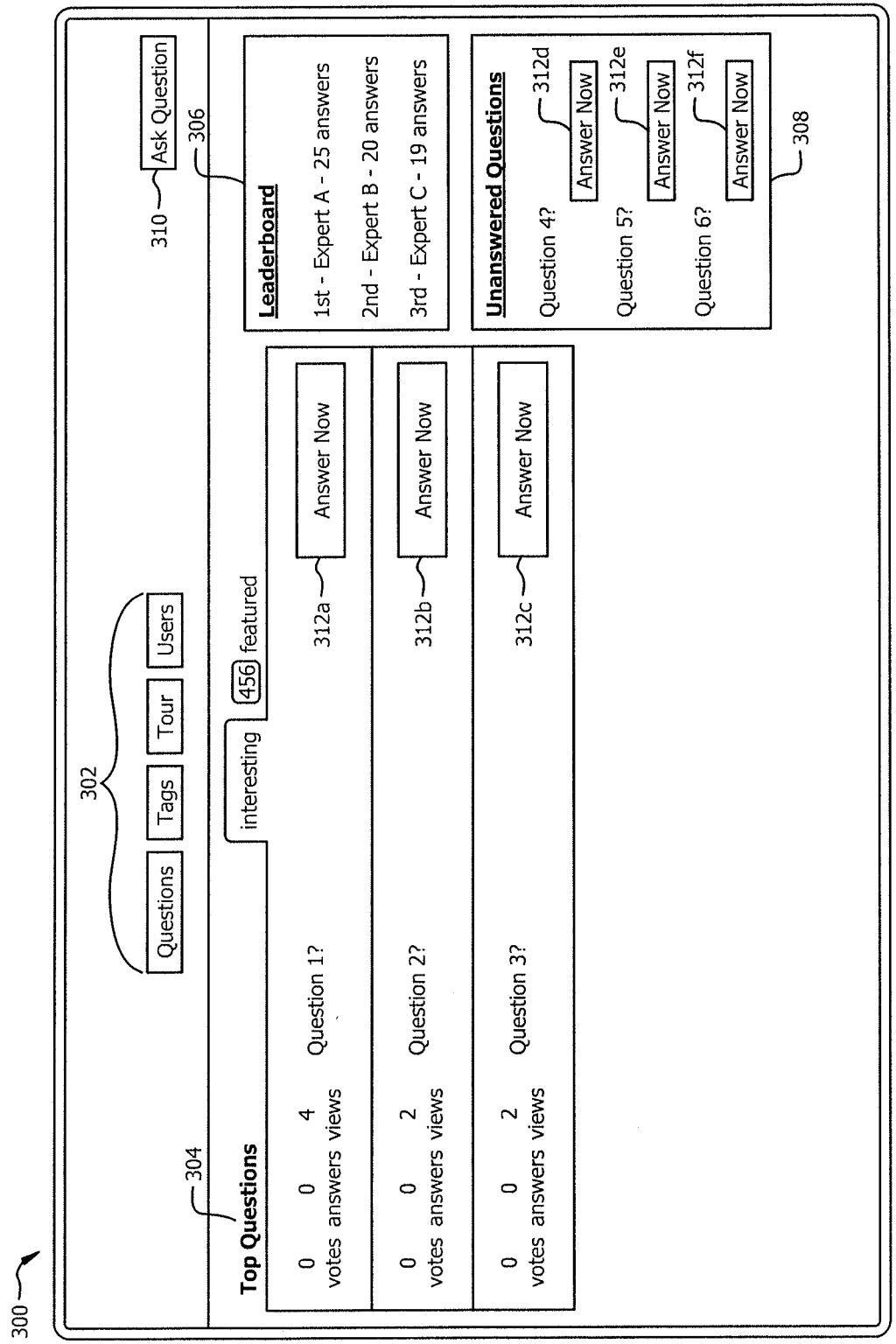
FIG. 3 illustrates an example embodiment of a GUI operable to display an administration screen, according to one embodiment of the present disclosure.

Embodiments of the present invention and its advantages are best understood by referring to FIGS. 1-3, like numerals being used for like and corresponding parts of the various drawings.

Users in an enterprise group may spend a significant amount of their time gathering information. One source of information may be expert users within the enterprise group. Determining the expert user(s) to contact regarding a particular question may consume a significant amount of time. Users may need to communicate with several other users within the enterprise group and/or conduct time consuming research to identify an expert user with sufficient knowledge to assist the requesting user. The teachings of this disclosure recognize that it would be desirable to identify expert users within an enterprise group more effectively and efficiently.

FIG. 1 illustrates system 100 for facilitating determining an expert user in an enterprise group to respond to a question, according to one embodiment of the present disclosure.

System 100 coordinates interactions between users 102 and collaboration module 110. Via the coordination, users 102 may identify one or more expert users in an enterprise group to respond to a question.

In the illustrated embodiment, system 100 includes a plurality of users 102, who are each associated with one or more devices 104. Users 102 interact with devices 104 to submit a request for information, which may comprise a question, and respond to requests over network 108. Collaboration module 110 may include interface 112 for receiving and communicating requests and/or other information associated with a request. Collaboration module may also include processor 114 and memory 116. Memory 116 may include logic 118 to process requests and may include e-mail information 120 for each user 104 in an enterprise group.

Users 102 represent any suitable person or persons and/or any suitable type of entity in any suitable industry that interacts with devices 104 to submit requests, submit an answer to a request, receive communication of information related to a request, or otherwise communicate with collaboration module 110. User 102a, for example, may be a person, a group of people, an organization, a business, or any other suitable entity.

Devices 104 may comprise any type of mobile or stationary computing device operable to communicate and interact with system 100 and/or any other suitable system. In particular embodiments, devices 104 allow users 102 to communicate with collaboration module 110 and to communicate with other users 102, for example, by e-mail. Examples of devices 104 include a mobile phone, personal digital assistant, laptop, netbook, ultrabook, tablet, desktop computer, cable box, television, automobile, and/or any other suitable device.

Devices 104 include any necessary hardware and software suitable to carry out their functions. For example, devices 104 may include a processor for executing routines associated with sending a request and/or receiving information associated with a request. A processor included in device 104 may comprise a programmable logic device, a microcontroller, a microprocessor, any suitable processing device, or any suitable combination of the preceding. Device 104 may also include a memory comprising a non-transitory computer-readable medium for storing software and data related to those software programs. Similarly, data may be input from user 102 and stored on device 104 in such a memory. Where appropriate, device 104 may include a network interface to implement communication protocols to allow device 104 to communicate with the other components of system 100.

Device 104 may include any suitable software to carry out its functions. For example, devices 104 may run any suitable operating system such as WINDOWS, MAC-OS, UNIX, LINUX, iOS, Windows Mobile, Android, and/or any other suitable operating system. Devices 104 may also include any suitable native applications, such as a web browser application, a messaging application, and/or a natively-installed client application specifically configured to work with one or more components of system 100.

Certain embodiments of system 100 include device 104*a* that is a mobile phone, device 104*b* that is a desktop computer, device 104*c* that is a tablet computer, and device 104*d* that is a laptop computer.

In certain embodiments, devices 104 include graphical user interfaces ("GUIs") 106, which may display information associated with user 102 and collaboration module 110. GUIs 106 allow users 102 to input a request, including a question, to receive information associated with a request, and to input a response to a request. GUIs 106 are generally operable to tailor and filter data entered by and presented to user 102. GUIs 106 may provide user 102 with an efficient and user-friendly presentation of information. For example, GUI 106*a* may display information associated with user 102*a* and provide options for inputting a request or responding to a request. Certain GUIs 106 may comprise a plurality of displays having interactive fields, pull-down lists, and buttons operated by user 102. GUIs 106 may include multiple levels of abstraction including groupings and boundaries. It should be understood that the term GUI may be used in the singular or in the plural to describe one or more GUIs and each of the displays of a particular GUI 106. Example GUIs 106 are described below with respect to FIG. 3.

GUIs 106 may be displayed to user 102 using a web browser that allows user 102 of device 104 to interact with a website, communicatively coupled to system 100 for example, by transmitting information to and receiving information from the website. Suitable web browsers may include Microsoft Internet Explorer®, Mozilla Firefox®, Google Chrome™, Apple Safari™, or Opera®. In certain embodiments, GUIs 106 may be displayed using an application natively installed on each device 104.

Network 108 represents any suitable network that facilitates communication between the components of system 100. Network 108 may include any interconnecting system capable of transmitting audio, video, signals, data, messages, or any combination of the preceding. Network 108 may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, any other suitable communication link, including combinations thereof operable to facilitate communication between the components of system 100.

Collaboration module 110 includes any suitable combination of components that facilitate communication with devices 104 and allow users 102 of devices 104 to submit requests to identify an expert user including questions requiring an answer from an expert user and/or respond to a request. In particular embodiments, collaboration module 110 is operable to determine one or more expert users to respond to a request, to communicate information associated with a request to the identified one or more expert users, and to receive responses to the requests.

Collaboration module 112 may include a network server, any suitable remote server, a mainframe, a host computer, a workstation, a web server, a personal computer, a file, server, or any other suitable device operable to facilitate communicating with devices 104 and processing requests received from devices 104. In some embodiments, application-store module 112 may execute any suitable operating system such as IBM's zSeries/Operating system (z/OS), MS-DOS, PC-DOS, MAC-OS, WINDOWS, UNIX, OPenVMS, Linux, iOS, Android, and/or any other appropriate operating systems, including operating systems developed in the future. The functions of collaboration module 110 may be performed by any suitable combination of one or more servers or other components at one or more locations. In the embodiment where the modules are servers, the servers may be public or private servers, and each server may be a virtual or physical server. The server may include one or more servers at the same or at locations remote from one another.

In certain embodiments, collaboration module 110 includes network interface 112, processor 114, and memory 116.

Network interface 112 represents any suitable device operable to receive information from network 108, perform suitable processing of the information, communicate to devices 104, or any combination of the preceding. For example, network interface 112 may receive a request to identify one or more expert users from user 102*a* of device 104*a* via network 108. Network interface 112 represents any port or connection, real or virtual, including any suitable hardware and/or software, including protocol conversion and data processing capabilities, to communicate through a LAN, WAN, or other communication systems that allows application-store module 112 to exchange information with the other components of system 100.

Processor 114 communicatively couples to network interface 112 and memory 116. Processor 114 controls the operation and administration of collaboration module 110 by processing information received from network interface 112 and memory 116. Processor 114 includes any hardware and/or software that operates to control and process information. For example, processor 114 executes logic 118 in memory 116 to control the operation of collaboration module 110. Processor 114 may be a programmable logic device, a microcontroller, a microprocessor, any suitable processing device, or any suitable combination of the preceding.

Memory 116 stores, either permanently or temporarily, data, operational software, rules, or other information for processor 114. Memory 116 includes any one or a combination of volatile or nonvolatile local or remote devices suitable for storing information, such as a non-transitory computer-readable storage medium. For example, memory 116 may include random access memory (RAM), read only memory (ROM), magnetic storage devices, optical storage devices, or any other suitable information storage device or a combination of these devices. While illustrated as including particular modules, memory 116 may include any suitable information for use in the operation of collaboration module 112.

In certain embodiments, memory 116 includes logic 118 and e-mail information 120.

Logic 118 represents any suitable set of instructions, logic, or code embodied in a non-transitory, computer-readable medium and operable to facilitate the operation of collaboration module 110.

E-mail information 120 represents an index of e-mail activity for each user 102 in an enterprise group. For example, e-mail information 120 may indicate that particular user 102b has an extensive amount of e-mail on a particular topic that may be relevant to a tag and/or a question submitted in a request.

Collaboration module 110 may instruct processor 114 to use e-mail information 120 and a request to determine one or more expert users for responding to the request. For example, after collaboration module 110 receives a request at network interface 112, it may instruct processor 114 to determine, based on the request and e-mail information 120, one or more expert users to respond to the request. Processor 114 may compare tags associated with the request to information in e-mail information 120. For example, processor 114 may determine that e-mail information 120 indicates that user 102b has e-mail activity indicating multiple discussions including one or more terms associated with the tag. Using e-mail information 120 and the one or more tags associated with the request, processor 114 may identify one or more expert users with e-mail activity indicating that the expert users have the most relevant knowledge related to the topic associated with the tag. Collaboration module 110 may then communicate information associated with the request to one or more devices 104 associated with the one or more identified expert users. For example, collaboration module 110 may communicate a question comprised in the request to device 104b for display on GUI 106b. User 102b may then receive notification that user 102b has been identified as an expert user and may view the question. In response, user 102b may choose to submit an answer to the question. Alternatively, user 102b may submit a response indicating that user 102b lacks knowledge of the subject of the question and/or does not know an answer, or otherwise respond to convey information to user 102a related to the request. Alternatively, user 102b may choose not to respond. Collaboration module 110 may receive a response from user 102b at network interface 112 and may communicate the response to user 102a by transmitting information using network interface 112 to device 104a for display on GUI 106a.

In an example embodiment of operation of system 100, user 102a uses GUI 106a of mobile phone device 104a to submit a request. For example, user 102a may submit a question to which user 102a would like an answer and for which user 102a has determined that expert knowledge within the enterprise group would be helpful. User 102a may indicate one or more tags associated with the request. For example, user 102a may determine that the request is associated with two topics corresponding to two tags and may indicate those tags accordingly. Device 104a may transmit the request over network 108 to collaboration module 110, where it is received at network interface 112. Processor 114 may use logic 118 to determine one or more expert users for responding to the request based on the tags of the request and e-mail information 120. Collaboration module 110 may communicate information related to the request to the one or more identified expert users. For example, network interface 112 may transmit the question to device 104b for display on GUI 106b because user 102a, who is associated with 104b, has been identified as an expert user. User 102a may input a response to the question using GUI 106b. For example, user 102b may submit an answer to the question. Device 104b may transmit the answer over network 108 to collaboration module 110, where it may be received at network interface 112. Processor 114 may use logic 118 to determine how the received response should be displayed on GUIs 106 and network interface 112 may transmit information over network 108 to devices 104 for display on GUIs 106.

A component of system 100 may include an interface, logic, memory, and/or other suitable elements. An interface receives input, sends output, processes the input and/or output, and/or performs other suitable operations. An interface may comprise hardware and/or software. Logic performs the operations of the component. For example, logic executes instructions to generate output from input. Logic may include hardware, software, and/or other logic. Logic may be encoded in one or more non-transitory, tangible media, such as a computer-readable storage medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 100 without departing from the scope of the disclosure. For example, processor 114 may be able to determine whether a request includes a tag and, if it does not, use logic 118 to determine one or more tags based on the question. As another example, collaboration module 110 may be operable to receive requests from users 102 of various enterprise groups and may use logic 118 to determine whether to limit identified expert users to only those expert users within the same enterprise group or otherwise determine which expert users are appropriate based on the enterprise group of the requesting user 102a. Alternatively or in addition, the enterprise group may be operable to determine one or more expert users based on tags associated with the request, a question comprised in the request, and e-mail information 120.

FIG. 2 illustrates an example method 200 for facilitating determining an expert user in an enterprise group, according to one embodiment of the present disclosure.

Collaboration module 110 may receive a request to identify an expert user at step 202. Specifically, network interface 112 of collaboration module 110 may receive the request from device 104a over network 108. The request may be associated with user 102a. User 102a may use GUI 106a on device 104a to submit a request to identify an expert user. For example, user 102a may type or otherwise input a question requiring an answer from an expert user and/or may select from a list of tags to identify the subject area of the question.

Collaboration module 110 may determine whether the request is associated with one or more tags at step 204. For example, user 104*a* may have indicated one or more tags associated with the request using GUI 106*a* or may have indicated no tags associated with the request and collaboration module 110 may determine whether user 104*a* indicated any tags associated with the request. If collaboration module 110 determines that one or more tags are associated with the request, the method may continue at step 206. If collaboration module 110 determines that no tags are associated with the request, the method may continue at step 208.

Collaboration module 110 may determine one or more expert users based on the one or more tags and e-mail information 120 at step 206. For example, collaboration module 110 may query e-mail information 120 using the one or more tags to determine that one or more expert users might be helpful in responding to the request. For example, based on logic 118 and e-mail information 120 stored in memory 116, collaboration module 110 may determine that the e-mail activity of one or more users 102 of the enterprise group and the tags associated with the request indicate that the one or more identified users 102 might be helpful in responding to the request.

Collaboration module 110 may determine one or more expert users based on the request and e-mail information 120 at step 208. For example, the request may include a question and collaboration module 110 may determine an expert user based on the question and e-mail information 120. In this example, collaboration module 110 may query e-mail information 120 based on the question comprised in the request to determine that one or more expert users might be helpful in answering the question. For example, based on logic 118 and e-mail information 120 stored in memory 116, collaboration module 110 may determine that the e-mail activity of one or more users 102 of the enterprise group and the question indicate that the one or more identified users 102 might be helpful in answering the question comprised in the request.

Collaboration module 110 may communicate information associated with the request to the one or more identified expert users at step 210. Specifically, network interface 112 of collaboration module 110 may transmit the information to one or more devices 104 over network 108. For example, network interface 112 may transmit a question comprised in a request for display on GUI 106*b* of device 104*b* because collaboration module 110 has identified user 102*b* as an expert user who may be helpful in responding to the request by answering the question comprised in the request.

Modifications, additions, or omissions may be made to method 200 disclosed herein without departing from the scope of the disclosure. The method may include more, fewer, or other steps. For example, certain embodiments may require that a requesting user identify one or more tags for every request, and the method may omit determining whether one or more tags are associated with the request at step 204 and instead continue at step 206 after receiving the request at step 204. As another example, the method may include determining one or more expert users based on a question in the request, one or more tags associated with the request, and e-mail information. As another example, certain embodiments may include determining one or tags to associate with the request based on other information associated with the request, such as a question, within the request, and then using the tags to determine one or more expert users. As an additional example, certain embodiments may use information about other user activity, in addition to e-mail information 120, to determine one or more expert users. For example, collaboration module 110 may also use information about web-browsing history of users 102 to determine one or more expert users to respond to a request. As another example, the method may include determining an enterprise group associated with the requesting user 104*a* and/or associated with the request and determine one or more expert users based on that enterprise group. For example, collaboration module 110 may identify expert users within the same enterprise group as the requesting user in order to comply with institutional or other rules. As an additional example, the method may include receiving a response from one or more expert users after communicating the information associated with the request to the one or more identified expert users. For example, collaboration module 110 may receive an answer to the question comprised in the request from one of the identified expert users. Additionally, steps may be performed in parallel or in any suitable order. For example, communication module 110 may determine one or more expert users based on one or more tags and may determine one or more expert users based on a question in the request in parallel.

FIG. 3 illustrates an example embodiment of GUI 300 operable to allow user 102*d* to view and input information associated with requests and responses to requests. In certain embodiments, GUI 300 may be an example of GUI 106 of FIG. 1. GUI 300 may appear on device 104*d* in response to a user navigating to a collaboration program or website for submitting and responding to requests. Navigation bar 302 may allow user 102*d* to view different types of information related to the requests and responses to those requests. For example, in certain embodiments, user 102*d* may click on "Questions" to view information about questions that have been submitted in requests. Top questions pane 304 may be a pane for displaying information about the top viewed questions. For example, in certain embodiments, top questions pane 304 may display the top three most viewed questions. Leaderboard pane 306 may identify users 102 who have answered the most questions. For example, leaderboard pane 306 may display the three users 102 who have answered the most questions. Unanswered questions pane 308 may display questions for which no user 102 has input an answer. Ask question button 310 may be a button that any user 102 may click on to input a request by asking a question and/or identifying one or more tags associated with the request. Answer now buttons 312 may be buttons that a user may click on to submit an answer to a question associated with a request. For example, user 102*d* may click on answer now button 312*a* to submit user 102*d*'s answer to "Question 1?." Modifications, additions, or omissions may be made to GUI 300 without departing from the scope of the disclosure. For example, GUI 300 may include additional or less information and/or buttons arranged in different displays.

Although the present disclosure has been described with several embodiments, a myriad of changes, variations, alterations, transformations, and modifications may be suggested to one skilled in the art, and it is intended that the disclosure encompass all such changes, substitutions, variations, alterations, transformations, and modifications as fall within the spirit and scope of the appended claims.

Certain embodiments of the disclosure may provide one or more technical advantages. For example, determining one or more expert users in the enterprise group to provide a response to the request based on the request and e-mail information may provide an efficient way to help gather information from an expert user. Accordingly, a user may identify an expert user and gather information more quickly and easily while using fewer network resources than might be needed otherwise. Another advantage of an embodiment may be more accurately identifying expert users. For example, using e-mail information and/or other user activity of users in the enterprise group may more accurately identify an expert user than asking other users and/or conducting other research may be able to. Another advantage of an embodiment is identifying expert users within the same enterprise group as the requesting user. For example, certain embodiments may only identify users within the same enterprise group of the requesting user, which may be advantageous for complying with institutional rules and/or laws.

Certain embodiments of the present disclosure may include some, all, or none of the above advantages. One or more other technical or other advantages may be readily apparent to those skilled in the art from the figures, descriptions, and claims included herein.

What is claimed is:

1. A system, comprising:
    an interface operable to receive, from a first device associated with a requesting user, a request, the requesting user being associated with an enterprise group, the enterprise group comprising a plurality of users, the request comprising a question and one or more tags selected by the requesting user, each tag of the one or more tags corresponding to a topic of the request;
    a memory operable to store:
        e-mail information for each of the plurality of users in the enterprise group, the e-mail information indicating one or more topics about which a user of the plurality of users has sent an e-mail; and
        a web browsing history for each of the plurality of users; and
    a processor communicatively coupled to the interface and the memory and operable to:
        determine whether the requesting user has selected the one or more tags;
        in response to a determination that the requesting user has selected the one or more tags, compare the one or more tags of the request to the e-mail information and the web browsing history to determine at least one first user of the plurality of users who has sent an e-mail about the one or more topics corresponding to the one or more tags selected by the requesting user;
        in response to a determination that the requesting user has not selected the one or more tags, compare the question to the e-mail information and to the web browsing history to determine at least one second user of the plurality of users who has sent an e-mail about the question;
    wherein the interface is further operable to:
        communicate, to one or more devices associated with at least one of the first user or the second user of the plurality of users, information associated with the request;
        present a question of a plurality of questions that has received a highest view count;
        present a user of the plurality of users who has answered a largest number of questions; and
        present a question of the plurality of questions that has received no answers.

2. The system of Claim 1, wherein the interface is further operable to receive, from a second device associated with a first expert user, a first response.

3. A non-transitory computer-readable medium comprising logic, the logic, when executed by a processor, operable to:
    receive, from a first device associated with a requesting user, a request, the requesting user being associated with an enterprise group, the enterprise group comprising a plurality of users, the request comprising a question and one or more tags selected by the requesting user, each tag of the one or more tags corresponding to a topic of the request;
    store:
        e-mail information for each of the plurality of users in the enterprise group, the e-mail information indicating one or more topics about which a user of the plurality of users has sent an e-mail; and
        a web browsing history for each of the plurality of users;
    determine whether the requesting user has selected the one or more tags;
    in response to a determination that the requesting user has selected the one or more tags, compare the one or more tags of the request to the e-mail information and the web browsing history to determine at least one first user of the plurality of users who has sent an e-mail about the one or more topics corresponding to the one or more tags selected by the requesting user;
    in response to a determination that the requesting user has not selected the one or more tags, compare the question to the e-mail information and the web browsing history to determine at least one second user of the plurality of users who has sent an e-mail about the question;
    communicate, to one or more devices associated with at least one of the first user or the second user of the plurality of users, information associated with the request;
    present a question of a plurality of questions that has received a highest view count;
    present a user of the plurality of users who has answered a largest number of questions; and
    present a question of the plurality of questions that has received no answers.

4. The computer-readable medium of claim 3, wherein the logic, when executed by a processor, is further operable to receive, by the interface and from a second device associated with at least one of the first or second user, a first response to the request.

5. A method, comprising:
    receiving, by an interface and from a first device associated with a requesting user, a request, the requesting user being associated with an enterprise group, the enterprise group comprising a plurality of users, the request comprising a question and one or more tags selected by the requesting user, each tag of the one or more tags corresponding to a topic of the request;
    storing:
        e-mail information for each of the plurality of users in the enterprise group, the e-mail information indicating one or more topics about which a user of the plurality of users has sent an e-mail; and
        a web browsing history for each of the plurality of users;
    determining whether the requesting user has selected the one or more tags;
    in response to a determination that the requesting user has selected the one or more tags, comparing the one or more tags of the request to the e-mail information and the web browsing history to determine at least one first user of the plurality of users who has sent an e-mail about the one or more topics corresponding to the one or more tags selected by the requesting user;

in response to a determination that the requesting user has not selected the one or more tags, comparing the question to the e-mail information and the web browsing history to determine at least one second user of the plurality of users who has sent an e-mail about the question;

communicating, by the interface and to one or more devices associated with at least one of the first user or the second user of the plurality of users, information associated with the request;

present a question of a plurality of questions that has received a highest view count;

present a user of the plurality of users who has answered a largest number of questions; and present a question of the plurality of questions that has received no answers.

\* \* \* \* \*